United States Patent [19]

Miyoshi et al.

[11] Patent Number: 4,753,357
[45] Date of Patent: Jun. 28, 1988

[54] CONTAINER CRANE

[75] Inventors: Yasuma Miyoshi, Tokorozawa; Hideo Jimbo, Tokyo, both of Japan

[73] Assignee: Ishikawajima-Harima Heavy Industries Co., Ltd., Tokyo, Japan

[21] Appl. No.: 941,445

[22] Filed: Dec. 15, 1986

[30] Foreign Application Priority Data

Dec. 27, 1985 [JP] Japan .................. 60-294683
Dec. 27, 1985 [JP] Japan .................. 60-294684

[51] Int. Cl.[4] .............................. B66C 13/12
[52] U.S. Cl. .................... 212/161; 340/685; 364/478; 364/559; 414/139
[58] Field of Search ............. 212/159, 160, 161; 414/120, 139; 358/101; 340/685; 364/478, 559

[56] References Cited

U.S. PATENT DOCUMENTS

| 3,884,363 | 5/1975  | Ajlouny         | 364/478 |
| 3,958,106 | 5/1976  | Bedford et al.  | 414/139 |
| 4,172,685 | 10/1979 | Nabeshima et al.| 414/139 |
| 4,363,585 | 12/1982 | Keller et al.   | 212/161 |
| 4,486,842 | 12/1984 | Hermann         | 358/101 |
| 4,611,292 | 9/1986  | Ninomiya        | 358/101 |

FOREIGN PATENT DOCUMENTS

| 973502  | 8/1975  | Canada | 414/139 |
| 133029  | 10/1979 | Japan  | 358/101 |

Primary Examiner—Joseph Peters, Jr.
Assistant Examiner—Thomas J. Brahan
Attorney, Agent, or Firm—Cullen, Sloman, Cantor, Grauer, Scott & Rutherford

[57] ABSTRACT

A container crane which can transport a container on a ship to a position on a land along the shortest route. The container crane comprises container transporting means for transporting a container, first and second detecting means for detecting the horizontal position and the vertical position, respectively, of a container on a ship, control means for calculating a route of movement of the container transporting means in response to information of the position of the container thus detected and for controlling the movement of the container transporting means in accordance with the calculated route of movement.

8 Claims, 5 Drawing Sheets

FIG. 2

CONTAINER CRANE

BACKGROUND OF THE INVENTION

1. Field of the Invention

This invention relates to a container crane for performing cargo work.

2. Description of the Prior Art

In performing cargo work for containers loaded in a ship, normally a container crane is used. For example, a container crane 1 show in FIG. 1 of the accompanying drawings includes a trolley 2 mounted for horizontal movement thereon and a spreader 3 suspended on the trolley 2. Thus, containers 5 on a ship 4 can be transferred to a bogie truck 7 on land 6 by the spreader 3.

In other to avoid possible collision of the spreader 3 with any of the containers 5, the spreader 3 is transported along a safe route A as shown in FIG. 1. In particular, in order to transport the containers 5 in several rows, the spreader 3 must be moved along the roundabout route A. Accordingly, a problem exists in that the working efficiency of the spreader 3 is low.

There is a current trend of automating container cranes. For such automation, positions of containers on a ship must be identified with accuracy. However, since a ship is normally rolling from various causes such as current, it is difficult to identify positions of containers on a ship relative to a position on the ground.

SUMMARY OF THE INVENTION

It is an object of the present invention to provide a container crane wherein the working efficiency is improved.

It is another object of the invention to provide a container crane which can be automated.

According to one aspect of the invention, there is provided a container crane, comprising container transporting means for transporting a container, first detecting means for detecting the horizontal position of a container on a ship, second detecting means for detecting the vertical position of the container on the ship, calculating means for calculating a route of movement of the container transporting means in response to information of the position of the container thus detected, and controls means for controlling movement of the container transporting means in accordance with the calculated route of movement. Thus, a container on a ship can be transported to a position on land along the shortest route.

According to another aspect of the invention, there is provided a container crane, comprising container transporting means for transporting a container, a measuring truck for detecting the horizontal position and the vertical position of a next container during transportation of a container by the container transporting means, said measuring truck including first and second detecting means for detecting the horizontal position and the vertical position, respectively, of a container on a ship, moving means for horizontally moving the measuring truck, and control means for controlling movement of the container transporting means and the moving means in response to position information received from the measuring truck. Thus, the accuracy in position detection can be improved and automation of work can be attained by detecting the position of a next container during transportation of a container.

BRIEF DESCRIPTION OF THE DRAWINGS

FIG. 2 is a side elevational view showing a container crane according to a first preferred embodiment of the present invention;

DESCRIPTION OF THE PREFERRED EMBODIMENTS

Figure 1:
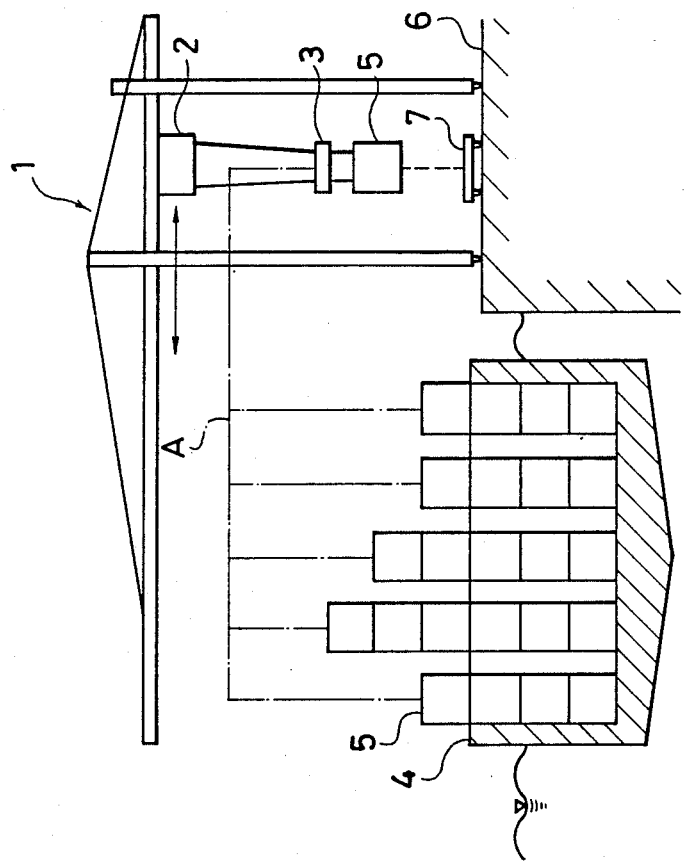
FIG. 1 is a side elevational view showing a conventional prior art container crane.

The preferred embodiments of the present invention will now be described with reference to the accompanying drawings.

Figure 2:
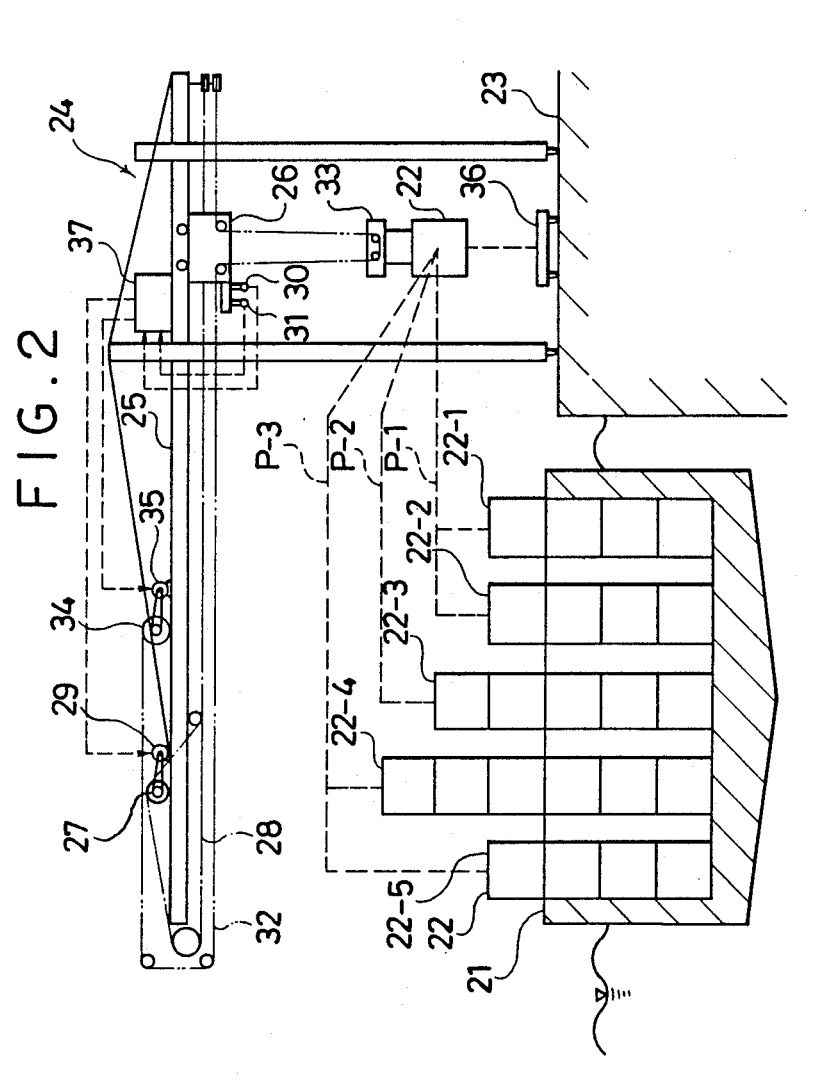

Referring first to FIG. 2 which shows a container crane according to a first embodiment of the invention, containers 22 are placed in a plurality of rows on a ship 21. A container crane 24 is located on land 23. A trolley 26 is suspended on a horizontal beam 25 of the container crane 24, and a wire 28 is connected to the trolley 26 and has its opposite ends wrapped around a drum 27. A motor 29 is connected to the drum 27 so that as the motor 29 is driven, the trolley 26 is moved horizontally along the beam 25.

The trolley 26 has an X-sensor 30 and a Z-sensor 31 provided thereon. The X-sensor 30 is provided for detecting the horizontal position of a container 22 in a row and is composed, for example, of a rotary encoder, a synchro, a pulse generator and other elements which cooperate to detect a position making use of a driven portion of the trolley 26. The Z-sensor 31 is provided to measure the height of containers 22 in a row and is composed of distance measuring equipment of either an ultrasonic type or the optical type.

A spreader 33 is suspended on the trolley 26 by means of a wire 32. Opposite ends of the wire 32 are wrapped around a drum 34 which is connected to a motor 35 so that as the motor 35 is driven, the spreader 33 is moved in a vertical direction. The spreader 33 is adapted to carry a container 22 thereon. Thus, a container 22 is transported by vertical movement of the spreader 33 and horizontal movement of the trolley 26. Reference numeral 36 denotes a bogie truck on land 23.

The container crane 24 has a control unit 37 provided thereon. The control unit 37 calculates and processes data transmitted thereto from the sensors 30, 31 and drive the motors 29 and 35 in response to results of such calculation.

The operation of the container crane will now be described. Initially, while no container is carried by the spreader 33, the motor 29 is activated in response to an instruction from the control unit 37 to reciprocate the trolley 26 once along the beam 25. During this reciprocation, horizontal position data Dx and height or vertical position data Dz of the container 22 are detected for the individual rows by the X-sensor 30 and the Z-sensor 31, respectively, on the trolley 26. The data Dx and Dz are immediately transmitted to the control unit 37.

The control unit 37 calculates routes for transportation of the containers 22 for the individual rows from the data received. Such calculations are effected so that distances travelled from the ship 21 to the bogie truck 36 may be minimized. For example, a route P-1 may be obtained for containers 22-1 for the first row, the same route P-1 may be obtained for containers 22-2 for the second row, a route P-2 for containers 22-3 for the third row, and a route P-3 for containers 22-4 and 22-5 for the fourth and fifth rows.

After completion of calculations of such routes, the control unit 37 operates to perform transportation of the containers 22 along the calculated routes. In particular, the motor 29 is driven to move the trolley 26 in horizontal directions while the motor 35 is driven to move the spreader 33 in vertical directions in order to transport the containers 22 to the bogie truck 36 along the calculated routes.

According to the present embodiment, the containers 22 in the individual rows can be transported in the respective shortest distances without taking a roundabout route A of the conventional prior art container crane shown in FIG. 1. Accordingly, the efficiency of the cargo work can be improved.

Figure 3:
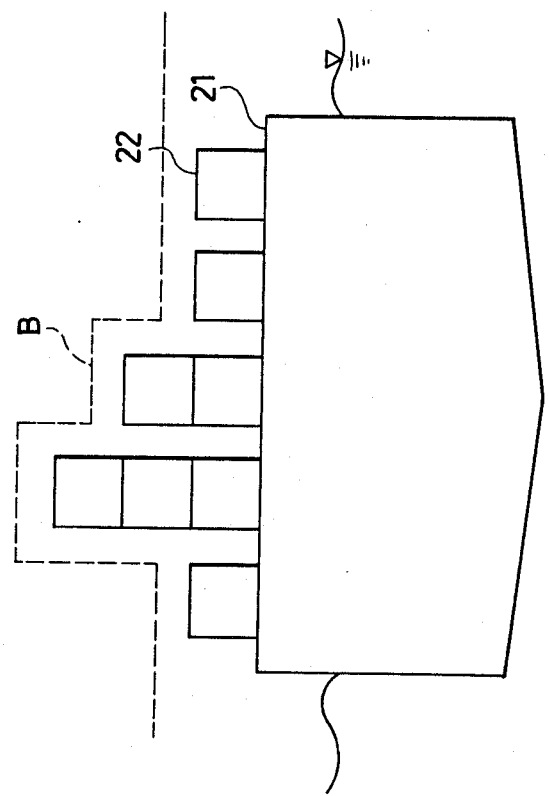
FIG. 3 is a schematic view illustrating a zone for preventing possible collision.

Further, since a profile of the accumulated containers 22 can be identified by the X-sensor 30 and the Z-sensor 31, a reasonable zone B for prevention of collision can be determined in combination with known winding and travelling speeds of the wire 32 and the trolley 26, respectively, as shown in FIG. 3. Consequently, even if the ship 21 rolls, safe, automatic operation is assured.

Figure 4:
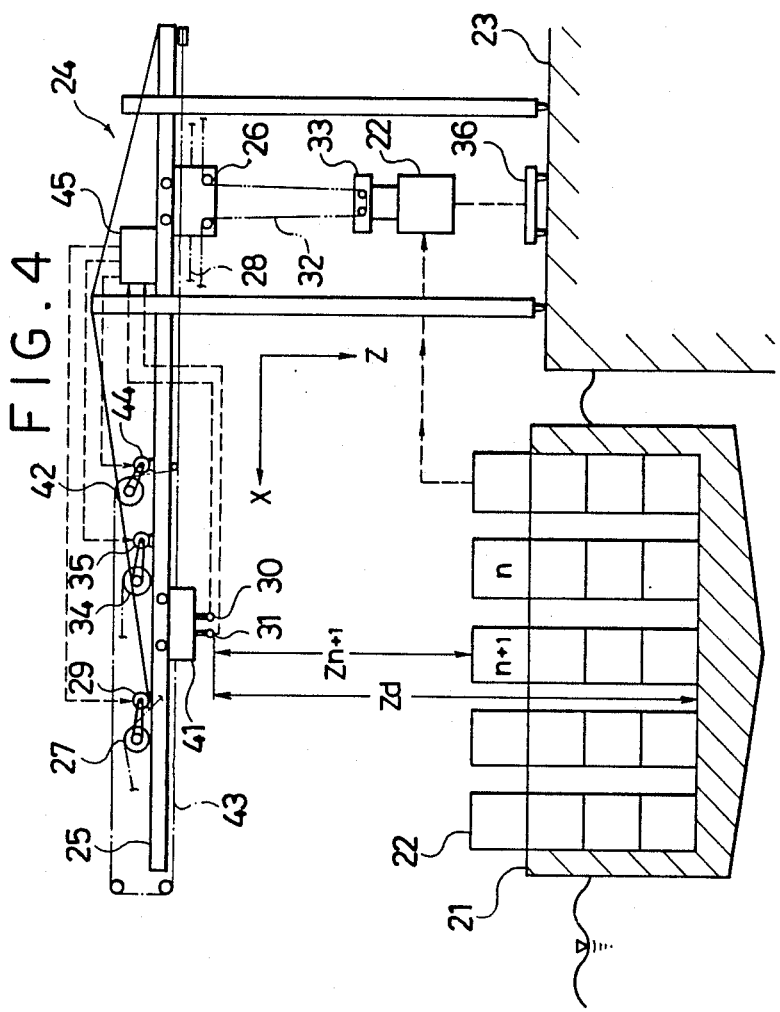
FIG. 4 is a side elevational view showing a container crane according to a second embodiment of the invention.

Referring now to FIG. 4, there is shown a container crane according to a second preferred embodiment of the invention. The container crane of the second embodiment is an improvement to that of the first embodiment described above. Accordingly, like components are denoted the same reference numerals used in FIG. 2.

In particular, containers 22 are accumulated on a ship 21 while a container crane 24 is located on land 23. A trolley 26 is connected to be moved in a horizontal direction along a beam 25 of the crane 24 by a motor 29 and has a spreader 33 suspended thereon. The spreader 33 is connected to be moved in a vertical direction by a motor 35. It is to be noted here that a wire 28 connected to the trolley 26 and a wire 32 for suspending the spreader 33 are partly omitted for simplification of illustration.

In the arrangement of the second embodiment, a measuring trolley 41 is suspended on the beam 25 and has an X-sensor 30 and a Z-sensor 31 provided thereon. A wire 43 is connected to the measuring trolley 41 and has opposite ends thereof wrapped around a drum 42. A motor 44 is connected to the drum 42 so that as the motor 44 is activated, the measuring trolley 41 is moved horizontally along the beam 25. It is to be noted that the measuring trolley 41 may otherwise be of the self-propelled type with a driving motor carried thereon. The trolley 26 and the measuring trolley 41 each include a collision preventing device for detecting and calculating the difference between positions of themselves in order to prevent collision therebetween.

The container crane 24 has a control unit 45 provided thereon. The control unit 45 calculates and processes data transmitted thereto from the sensors 30, 31 and drives the motors 29, 35 and 44 in response to results of such calculations.

The operation of the container crane of the second embodiment will now be described. Initially, the motor 44 is activated in response to an instruction from the control unit 45 to move the measuring trolley 41 along the beam 25. In this instance, horizontal position data Dx and height or vertical position data Dz detected by the X-sensor 30 and the Z-sensor 31, respectively, are transmitted to the control unit 45. The control unit 45 identifies the position of a first container 22 from the data thus received and drives the motors 29 and 35 to move the spreader 33 to the thus identified position. At this point, the measuring trolley 41 is stopped. Then, the first container 22 is transported to a bogie truck 36 on the land 23 by the spreader 33.

In FIG. 4, the spreader 33 is shown transporting the first container 22. During transportation of the first container 22, the motor 44 is activated again by the control unit 45, and the measuring trolley 41 searches the position of a second container 22. Coordinates (X, Z) and the order of transportation of the individual containers 22 are determined in advance either by a control center on the premises or on the crane. However, since the ship 21 rolls, the positions of the containers 22 are indefinite. Therefore, the position of the second container 22 is detected with accuracy by the measuring trolley 41. Then, the second container 22 is transported by the spreader 33 after the first container 22 has been transported by the spreader 33.

In this manner, the position of the n+1th container is detected during transportation of the nth container.

Figure 5:
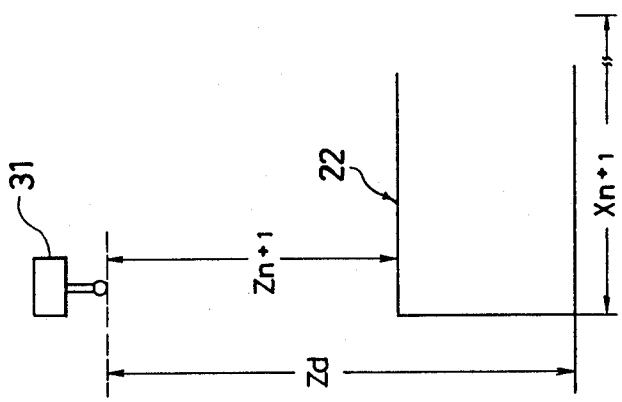
FIG. 5 is a diagrammatic representation illustrating a method of detecting a container.
Figure 6:
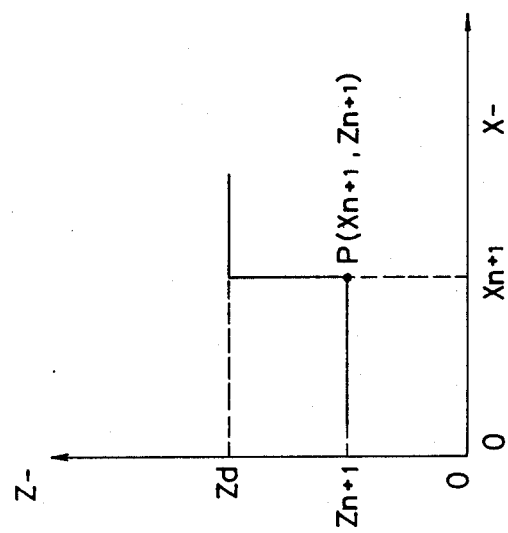
FIG. 6 is a graph showing outputs of an X-sensor and a Y-sensor when the method of FIG. 5 is performed.

Detection of the position is effected as follows. Initially, coordinates $(X_n, Z_n)$ of the position of the nth container which were detected the last time are compared with predetermined coordinates (X, Z) for the nth container. Then, using differences between the coordinates, predetermined coordinates for the n+1th container are corrected. Thus, the measuring trolley 41 is moved toward a thus corrected horizontal coordinate X', and the Z-sensor 31 searches within a range of ±4 feet from the position of the coordinate X'. As shown in FIGS. 5 and 6, where the X coordinate is $X_n+1$, the output of the Z-sensor 31 exhibits a sudden change from the distance $Z_n+1$ to a container 22 to a different distance Zd either to the bottom of the ship or to a container underlying the n+1th container. Accordingly, an edge of the n+1th container can be detected from the output $X_n+1$ of the X-sensor 30 and the output $Z_n+1$ of the Z-sensor 31 when the output of the Z-sensor 30 exhibits such a sudden change. The control unit 45 calculates from the coordinate data $(X_n+1, Z_n+1)$ a point at which the trolley 26 is to stop automatically and a point at which the spreader 33 is to begin its deceleration. Thereafter, the control unit 45 operates to activate the motors 29 and 35 to move the trolley 36 and the spreader 33, respectively, in order to transport the n+1th container 22.

In this manner, according to the present embodiment, the position of a next container is detected during transportation of a container. Accordingly, even if a ship rolls, the position of a next container can be detected with accuracy to perform automatic operation of the container crane.

It is to be noted that while in the second embodiment an edge of a container is detected in order to identify the position of the container, opposite ends of a container may alternatively be detected in order to determine the position of the center of the container from the positions of the same.

If a plurality of Z-sensors are mounted on the measuring trolley 41 for detecting an additional coordinate $Y_n+1$ in a direction (Y direction) perpendicular to the plane of the drawing, detection of the position of a container can be attained with higher accuracy.

Further, it is also possible to use the arrangement of the second embodiment in order to calculate the shortest transportation routes for individual containers and control the transportation of the individual containers along the shortest transportation routes as in the first embodiment described above.

Further, while a description has been provided only of unloading of containers in the first and second embodiments, the present invention can also be applied to loading of containers.

As is apparent from the foregoing description, according to the present invention, the following effects can be attained.

(1) The efficiency of cargo work can be improved because containers in several rows can be transported to a position on land along the individual shortest routes of transportation.

(2) A trolley and a spreader can be safely operated because a safety zone can be determined in accordance with a condition of cargo work.

(3) The position of a container on a ship relative to a position on land can be detected with accuracy. Accordingly, automation of a container crane can be attained.

What is claimed is:

1. A container crane for carrying a container from a ship to a predetermined point above the ground, comprising:
    container carrying means for carrying a container from the ship to said predetermined point;
    first detecting means for detecting the horizontal position of the container to be carried from the ship;
    second detecting means for detecting the vertical position of said container on the ship as well as the vertical clearance between said container carrying means and obstructions existing between said predetermined point and said container;
    traveling path determining means for determining the shortest traveling path of said container from the ship to said predetermined point in accordance with said vertical clearance between said container carrying means and said obstructions; and,
    control means for controlling the movement of said container carrying means along said shortest traveling path determined by said traveling path determining means.

2. The container crane of claim 1, wherein aid container carrying means includes a horizontally extending beam, a trolley mounted for movement along said beam, a spreader suspended on said trolley for carrying a container thereon, first driving means for horizontally moving said trolley, and second driving means for vertically moving said spreader.

3. The container crane of claim 2, wherein said first and second detecting means are provided on said trolley.

4. The container crane of claim 3, wherein aid control means controls the movement of said first and second driving means.

5. A container crane for carrying containers from a ship to a predetermined point above the ground, comprising:
    container carrying means for carrying a container located on the ship;
    a measuring trolley for detecting the horizontal position and the vertical position of the next container to be carried as well as the vertical clearance between said container carrying means and obstructions existing between said next container and said predetermined point during transportation of the container by said container carrying means, said measuring trolley including first detecting means for detecting the horizontal position of said next container and second detecting means for detecting the vertical position of said next container and the vertical clearance between said container carrying means and said obstructions;
    moving means for horizontally moving said measuring trolley;
    traveling path determining means for determining the shortest traveling path of said container carrying means in accordance with vertical clearance information and said next container position information received from said measuring trolley; and
    controlling means for controlling the movement of said container carrying means and said moving means in accordance with said shortest traveling path information and container position information received from said measuring trolley.

6. The container crane of claim 5, wherein said container carrying means includes horizontally extending beam, a second trolley mounted for movement along said beam, a second spreader suspended on said second trolley for carrying a container thereon, first driving means for horizontally moving said second trolley, and second driving means for vertically moving said spreader.

7. The container of claim 6, wherein said control means controls the movement of said first and second driving means and said moving means.

8. A container for carrying a container from a ship to a predetermined point above the ground comprising:
    container carrying means for carrying a container to be carried from the ship;
    a measuring trolley including first detecting means for detecting the horizontal position of the container on the ship and second detecting means for detecting the vertical position thereof as well as the vertical clearance between said container carrying means and obstructions existing between said container to be carried and said predetermined point;
    moving means for horizontally moving said measuring trolley; and
    control means for determining the shortest traveling path of said container carrying means in response to container position information and vertical clearance information received from said measuring trolley and for controlling the movement of said container carrying means and said moving means in accordance with said shortest traveling path to be determined.

* * * * *